(12) United States Patent
Chung et al.

(10) Patent No.: US 10,753,403 B2
(45) Date of Patent: Aug. 25, 2020

(54) CLUTCH UNIT

(71) Applicant: REALGAM CO.,LTD., Sungnam-si Gyeonggi-do (KR)

(72) Inventors: Yon Woo Chung, Seoul (KR); Bok Sung Oh, Anyang-si (KR); Yun Ho Lee, Anyang-si (KR)

(73) Assignee: REALGAM CO., LTD., Sungnam-si (KR)

( * ) Notice: Subject to any disclaimer, the term of this patent is extended or adjusted under 35 U.S.C. 154(b) by 1 day.

(21) Appl. No.: 16/311,525

(22) PCT Filed: Jan. 19, 2017

(86) PCT No.: PCT/KR2017/000639
§ 371 (c)(1),
(2) Date: Dec. 19, 2018

(87) PCT Pub. No.: WO2018/131741
PCT Pub. Date: Jul. 19, 2018

(65) Prior Publication Data
US 2019/0219103 A1 Jul. 18, 2019

(30) Foreign Application Priority Data

Jan. 12, 2017 (KR) .................. 10-2017-0005171

(51) Int. Cl.
*F16D 3/04* (2006.01)
*F16D 41/04* (2006.01)
(Continued)

(52) U.S. Cl.
CPC .............. *F16D 3/04* (2013.01); *F16D 15/00* (2013.01); *F16D 17/00* (2013.01); *F16D 41/04* (2013.01);
(Continued)

(58) Field of Classification Search
CPC . F16D 3/04; F16D 15/00; F16D 17/00; F16D 41/04; F16D 2500/5046;
(Continued)

(56) References Cited

U.S. PATENT DOCUMENTS

| 4,770,054 A | * | 9/1988 | Ha | F16D 41/066 |
| | | | | 192/223.2 |
| 5,398,791 A | * | 3/1995 | Tombers | C25D 5/022 |
| | | | | 192/107 M |

(Continued)

FOREIGN PATENT DOCUMENTS

| CN | 105745461 A | 7/2016 |
| EP | 3101298 A1 | 12/2016 |

(Continued)

OTHER PUBLICATIONS

International Search Report for PCT/KR2017/000639 dated, Sep. 11, 2017.

(Continued)

*Primary Examiner* — David J Hlavka
(74) *Attorney, Agent, or Firm* — Sughrue Mion, PLLC

(57) ABSTRACT

A clutch unit includes: a first housing which is provided with a groove recessed inwards; a second housing which is inserted to the groove of the first housing and is provided with one or more arc portions to protrude along a circumference thereof on one surface thereof; one or more first roller portions which are positioned between the first arc portions; and a first rotation transfer portion which is inserted to the second housing and is rotated in accordance with rotation of a motor, wherein rotation of the first housing is controlled by the first rotation transfer portion and the first housing is not rotatable by external force when the first (Continued)

housing is attached to the first roller portions, and is freely rotatable by external force when the first housing is detached from the first roller portions.

6 Claims, 4 Drawing Sheets

(51) Int. Cl.
*F16D 17/00* (2006.01)
*F16D 15/00* (2006.01)
(52) U.S. Cl.
CPC .............. *F16D 2500/5046* (2013.01); *F16D 2500/70416* (2013.01)
(58) Field of Classification Search
CPC ... F16D 2500/70416; F16D 2041/0608; F16D 2001/102; F16D 41/064
See application file for complete search history.

(56) References Cited

U.S. PATENT DOCUMENTS

| | | | |
|---|---|---|---|
| 5,706,700 A * | 1/1998 | Takagi | F02N 15/023 188/82.84 |
| 6,093,991 A | 7/2000 | Tanaka | |
| 6,409,000 B1 * | 6/2002 | Itoh | B60K 17/26 180/247 |
| 2010/0320054 A1 * | 12/2010 | D'Eredita | F16D 41/064 192/41 R |
| 2016/0215826 A1 * | 7/2016 | Reimchen | F16D 41/067 |
| 2016/0298703 A1 | 10/2016 | Williams | |

FOREIGN PATENT DOCUMENTS

| | | |
|---|---|---|
| JP | 2001-334477 A | 12/2001 |
| KR | 10-2001-0072158 A | 7/2001 |
| KR | 10-2014-0000218 A | 1/2014 |
| KR | 10-1451318 B1 | 10/2014 |
| KR | 10-1524182 B1 | 6/2015 |
| WO | 2012/139009 A1 | 10/2012 |

OTHER PUBLICATIONS

Extended European Search Report dated Jan. 8, 2020, from the European Patent Office in Application No. 17891481.8.
Communication dated Mar. 4, 2020, from the China National Intellectual Property Administration in Application No. 201780083248.0.

* cited by examiner

CLUTCH UNIT

CROSS REFERENCE TO RELATED APPLICATIONS

This application is a National Stage of International Application No. PCT/KR2017/000639 filed Jan. 19, 2017, claiming priority based on Korean Patent Application No. 10-2017-0005171, filed Jan. 12, 2017.

TECHNICAL FIELD

The present invention relates a clutch unit, and more specifically, to a clutch unit which provides a free state where it is freely rotatable by external force and a control state where it is rotated by a motor and is not rotatable by external force.

BACKGROUND ART

Technology in which a user can easily experience virtual reality or can watch 3D images has been developed through development of a display device and sustainable development of a content network. Particularly, for more realistic virtual reality experience, an exoskeleton device which controls motion of a human in accordance with movement of virtual reality contents has been developed.

However, the conventional exoskeleton device can be controlled in a situation in which rotational force of a motor is transferred to user's body, that is, a situation in which user's motion is controlled by operation of a motor, and is designed such that a user cannot freely move user's body when the motor is not operated, and a virtual reality device using only a single motor has less sense of reality.

Accordingly, in order to remove such incongruity of virtual reality and reality to further increase immersion, a demand for a clutch unit which controls user's motion through operation of a motor and allows a user to freely move user's body in a situation in which the motor is not operated has occurred.

SUMMARY OF INVENTION

Technical Problem

A technical problem of the present invention is to provide a clutch unit which controls user's motion through operation of a motor and allows a user to freely move user's body in a situation in which the motor is not operated. Such a technical problem is applied to interaction of physical movement generated between a human and a human, between a human and a machine, and between a real world and a virtual world.

A technical problem of the present invention is not limited to the technical problem described above, and a person skilled in the art will clearly understand other technical problems which are not mentioned from the following description.

Solution to Problem

In order to achieve the technical problem, an embodiment of the present invention provides a clutch unit which provides a free state where it is freely rotatable by external force and a control state where it is rotated by a motor and is not rotatable by external force.

In an embodiment of the present invention, a clutch unit includes: a first housing which is provided with a groove recessed inwards; a second housing which is inserted to the groove of the first housing and is provided with one or more first arc portions to protrude along a circumference thereof on one surface thereof; one or more first roller portions which are positioned between the first arc portions; and a first rotation transfer portion which is inserted to the second housing and is rotated in accordance with rotation of a motor, wherein rotation of the first housing is controlled by the first rotation transfer portion and the first housing is not rotatable by external force when the first housing is attached to the first roller portions, and is freely rotatable by external force when the first housing is detached from the first roller portions.

In the embodiment of the present invention, the clutch unit may further include a speed change portion which is coupled to the other surface of the second housing and changes relative rotation speeds of the first housing and the second housing to attach and detach the first roller portions to and from the first housing.

In the embodiment of the present invention, the speed change portion may reduce a speed of the second housing by friction.

In the embodiment of the present invention, the clutch unit may further include an attachment and detachment module which changes relative rotation speeds of the first housing and the second housing provided with one or more second arc portions on the other surface thereof to attach and detach the first roller portions to and from the first housing, wherein the attachment and detachment module may include a third housing which is provided with a through-hole in a length direction, one or more second roller portions which are inserted to the through-hole of the third housing, are positioned between the second arc portions, and are pushed and rotated by the second arc portions in accordance with rotation of the second arc portions, a second rotation transfer portion which is inserted to the through-hole of the third housing and is pushed and rotated in accordance with rotation of the second roller portions, and a motor connection portion which is coupled to one surface of the third housing, is connected to a motor, is rotated in accordance with rotation of the motor, and is provided with a rotation shaft transferring rotational force of the motor to the first rotation transfer portion, wherein the second rotation transfer portion may have one area formed of a material having dynamic stability, and may reduce a rotation speed of the second housing.

In the embodiment of the present invention, the first rotation transfer portion may be provided with a roller contact surface on an outer circumferential surface thereof as many as the number of first roller portions.

In the embodiment of the present invention, the second rotation transfer portion may include a body which is provided with a through-hole to which the rotation shaft of the motor connection is inserted, first extension portions which vertically protrude from the body, second extension portions which are vertically bent and extend from the first extension portion to both sides, third extension portions which are formed to extend from each second extension portion and have dynamic stability, wherein the second rotation transfer portion may be pushed and rotatable by the second roller portions, and the third extension portions can be compressed by the second roller portions at the time of rotating.

In the embodiment of the present invention, the first rotation transfer portion may include a main body which is provided with the roller contact surface, and a cylindrical rotation center shaft which vertically extends from one surface of the main body, wherein the second housing may be provided with a through-hole in a length direction, and the rotation center shaft may be inserted to the through-hole of the second housing.

In the embodiment of the present invention, the first roller portions and the second roller portions may be formed in a cylindrical shape.

Advantageous Effects of Invention

According to the embodiment of the present invention, when the first rollers are attached to the first housing by using rotation speed difference between the first rotation transfer portion and the second housing, rotational force of the second housing is transferred to the first housing, and the first housing is not rotated by external force. When the first rollers are detached from the first housing, the first housing is freely rotatable by external force. Accordingly, it is possible to provide a control state and a free state to a user.

In addition, according to the embodiment of the present invention, when the clutch unit of the present invention providing the control state and the free state is applied to a virtual reality image control device, it is possible to improve sense of reality.

Advantages of the present invention are not limited to the above-described advantage, and should be understood as including all advantages which can be inferred from configurations of the present invention described in Detailed Description or Claims of the present invention.

DESCRIPTION OF EMBODIMENTS

Figure 1:
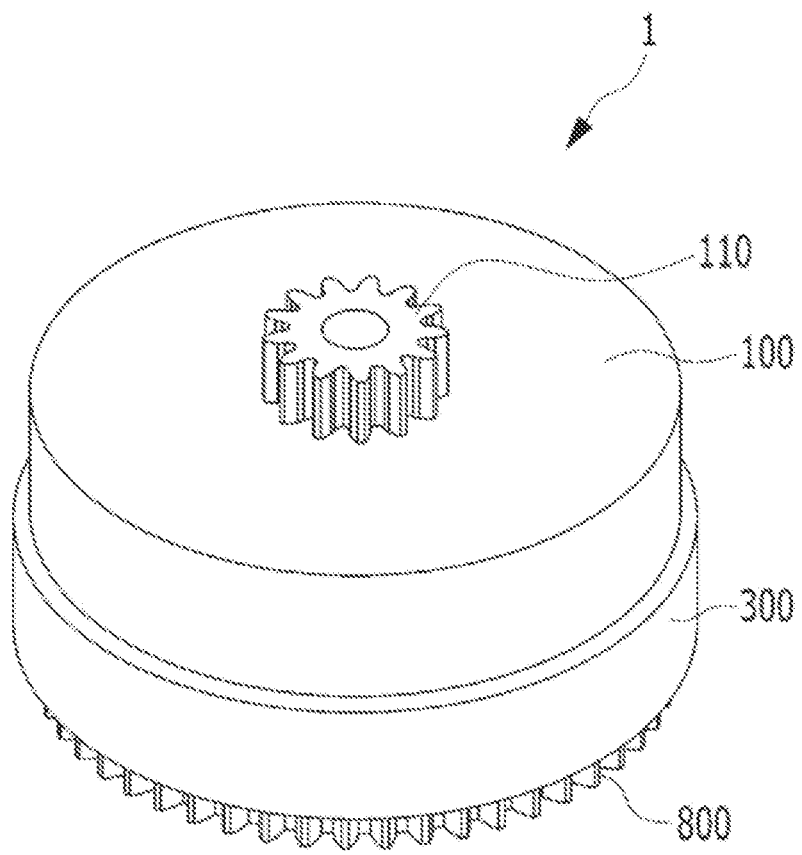
FIG. 1 is a perspective view illustrating a clutch unit according to an embodiment of the present invention.

Hereinafter, the present invention will be described with reference to the accompanying drawings. However, the present invention may be embodied in various different forms, and is not limited to embodiments described herein. In order to clearly describe the present invention in the drawings, parts which are not related to the description are omitted, and similar reference numerals and signs are given to similar parts throughout Specification.

Throughout Specification, when it is described that a certain part is "connected (coupled, contacted, or combined)" to the other part, this includes a case of "indirect connection" with another member interposed therebetween as well as a case of "direct connection". In addition, when it is described that a certain part "includes" a certain constituent element, it means that the part does not exclude another constituent element but may further have another constituent element unless otherwise described.

Terms used in Specification are used to merely explain a specific embodiment, and does not intent to limit the present invention. Singular expression includes plural expression unless clearly differently meaning contextually. In Specification, terms such as "include" or "have" are to designate that there are features, numerals, steps, operations, constituent elements, components, or combination thereof described in Specification, but it should be understood that existence or addition possibility of one or more other features, numerals, steps, operations, constituent elements, components, or combination thereof is not excluded in advance.

Hereinafter, embodiments of the present invention will be described in detail with reference to the accompanying drawings.

Figure 2:
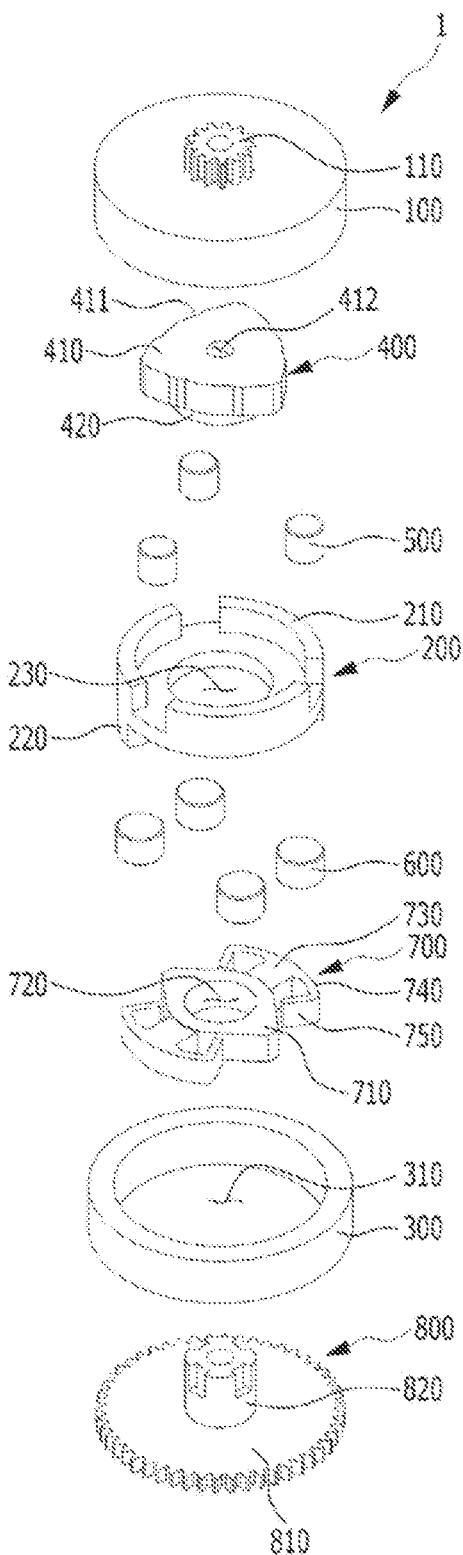
FIG. 2 is an exploded perspective view illustrating a clutch unit according to an embodiment of the present invention.
Figure 3:
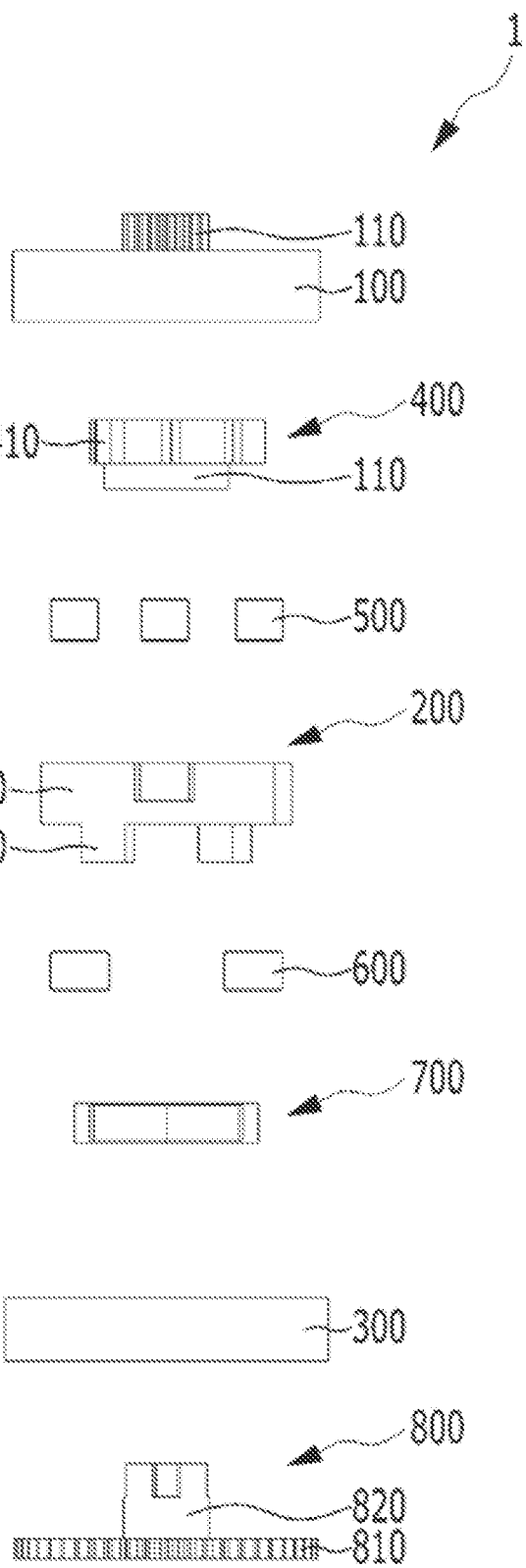
FIG. 3 is an exploded side view illustrating a clutch unit according to an embodiment of the present invention.

FIG. 1 is a perspective view illustrating a clutch unit 1 according to an embodiment of the present invention, FIG. 2 is an exploded perspective view illustrating a clutch unit 1 according to an embodiment of the present invention, and FIG. 3 is an exploded side view illustrating a clutch unit 1 according to an embodiment of the present invention.

Referring to FIG. 1 to FIG. 3, a clutch unit 1 according to an embodiment of the present invention includes a first housing 100, a second housing 200, first roller portions 500, and a first rotation transfer portion 400.

The first housing 100 and the second housing 200 are constituent elements which settle or store the first rotation transfer portion 400 and the first roller portions 500, and are rotatable in accordance with rotation of the first rotation transfer portion 400.

The first housing 100 may be formed in a cylindrical shape provided with a groove (not illustrated) recessed inwards from one surface thereof. The first housing 100 may be provided with a gear portion 110 for engagement with the other gear (not illustrated) on the other surface thereof. Accordingly, it is possible to transfer rotational force of the first housing 100 to the other gear through the gear portion 110 of the first housing 100.

The second housing 200 may be formed in a disc shape provided with one or more first arc portions 210 to protrude along a circumference on one surface thereof. It is preferable that the second housing 200 is formed with a diameter smaller than a diameter of a groove (not illustrated) of the first housing 100 such that it is inserted to the groove of the first housing 100. When one first arc portions 210 is provided, it is preferable that a distance between one end and the other end of the first arc portion 210 is larger than a diameter of the first roller portion 500. When a plurality of first arc portions 210 are provided, it is preferable that they are disposed at a distance larger than the diameter of the first roller portions 500. In addition, it is preferable that the first arc portions 210 are formed as many as the number of first roller portions 500.

The first roller portions 500 and the first rotation transfer portion 400 are constituent elements which rotate the first housing 100 and the second housing 200 by rotational force generated in a motor (not illustrated). The first rotation transfer portion 400 is inserted to the second housing 200 and is rotated by receiving rotational force of the motor. The first rotation transfer portion 400 may include a plate-shaped main body 410 which is provided with a through-hole 412 in a length direction at the center portion thereof, and a rotation center shaft 420 which extends in a vertical direction from the center portion of one surface of the main body 410. In this case, the second housing 200 may be provided with a through-hole 230 in a length direction, and the rotation center shaft 420 may be inserted to the through-hole 230.

In addition, roller contact surfaces 411 may be formed on the outer circumferential surface of the main body 410. The roller contact surfaces 411 are constituent elements which allow the first roller portions 500 to be pushed and rotated in accordance with rotation of the first rotation transfer portion 400 and may be formed on the outer circumferential surface of the main body 410 in a curve or linear shape as many as the number of first roller portions 500, and the surface thereof may be unevenly formed for friction with the first roller portions 500. It is preferable that the diameter of the main body 410 of the first rotation transfer portion 400 is smaller than the diameter of the second housing 200 such that it is settled and rotated in the second housing 200. In FIG. 2 and FIG. 3, the rotation transfer portion 400 provided with three roller portions 500 and three roller contact surface 411 is illustrated.

The first roller portion 500 is positioned between the first arc portions 210, and may be formed in a cylindrical shape. One surface of the first roller portion 500 may come in contact with the second housing 200, and the other surface may come in contact with the first housing 100. In accordance with rotation of the first rotation transfer portion 400, the first roller portions 500 are pushed by the first rotation transfer portion 400, come in contact with the first housing 100 and the second housing 200, and push and rotate the second housing 200. In this case, the first housing 100 coming in close contact with the first roller portions 500 is also rotated together with the second housing 200. FIG. 2 and FIG. 3 illustrate only the first roller portions 500 having a cylindrical shape, but it is obvious that the first roller portions 500 may be formed in a spherical shape.

The clutch unit 1 according to the embodiment of the present invention may further include a speed change portion (not illustrated) coupled to the other surface of the second housing 200. The speed change portion (not illustrated) is a constituent element which changes relative rotation speeds of the first housing 100 and the second housing 200 to attach or detach the first roller portions 500 to or from the first housing 100. In this case, the speed change portion (not illustrated) is formed in a friction plate shape, can change a speed of the second housing by friction, but is not limited thereto, and may be formed in various types such as electromagnet.

In addition, the clutch unit 1 according to the embodiment of the present invention may further include an attachment and detachment module. The attachment and detachment module includes a third housing 300, second roller portions 600, a second rotation transfer portion 700, and a motor connection portion 800. The attachment and detachment module is a constituent element which changes relative rotation speeds of the first housing and the second housing 200 to attach or detach the first roller portions 500 to or from the first housing 100, and the first housing 100 can be rotated in accordance with rotation of the first roller portions 500 by the attachment and detachment module.

The third housing 300 is a constituent element which prevents the second roller portions 600 and the second rotation transfer portion 700 from escaping, and is formed in a cylindrical shape provided with a through-hole 310 in a length direction. In this case, it is preferable that the third housing 300 is formed larger than the diameter of the second housing 200 to insert a part of the second housing 200.

The second roller portions 600 and the second rotation transfer portion 700 are constituent elements which are rotated by receiving rotational force from the second housing 200, and are inserted to the through-hole 310 of the third housing 300. The second roller portions 600 are formed in a cylindrical shape similarly to the first roller portions 500, one surface thereof may come in contact with the motor connection portion 800, and the other surface thereof may come in contact with the second housing 200. In this case, the second housing 200 is provided with one or more second arc portions 220 along the circumference thereof on the other surface thereof. The second roller portions 600 are positioned on both sides with the second arc portion 220 interposed therebetween, and are pushed and rotated in accordance with rotation of the second housing 200. It is preferable that the number of second arc portions 220 is a half of the number of second roller portions 600. For example, when the number of second roller portions 600 is n, the number of second arc portions 220 may be n/2. FIG. 2 and FIG. 3 illustrate four second roller portions 600 and two second arc portions 220. In this case, the second arc portion 220 and the second rotation transfer portion 700 are positioned between the second roller portions 600, and a plurality of second roller portions 600 may not come in contact with each other.

When the second roller portions 600 are rotated, the second rotation transfer portion 700 coming in contact with the second roller portions 600 is also pushed and rotated in accordance with rotation of the second roller portions 600. Although FIG. 2 and FIG. 3 illustrate only the cylindrical second roller portions 600, it is obvious that the second roller portions 600 may be formed in a spherical shape. In this case, since the second roller portions 600 are positioned on both sides with the second arc portion 220 interposed therebetween, the second rotation transfer portion 700 in the traveling direction can be pushed and rotated irrespective of the rotation direction (forward rotation, reverse rotation) of the second housing 200.

The second rotation transfer portion 700 is a constituent element which generates rotation speed difference between the first rotation transfer portion 400 and the second housing 200, and includes a body 710, first extension portions 730 extending from the body 710, second extension portions 740 extending from the first extension portions 730, and third extension portions 750 extending from the second extension portions 740.

The body 710 may be formed of an oval cylinder provided with a through-hole 720 at the center thereof, and a rotation shaft 820 of the motor connection portion 800 can be inserted to the through-hole 720. The first extension portions 730 are formed to vertically extend from the body 710, and the second extension portions 740 may be vertically bent and extend from one end of the first extension portion 730 to both sides. The third extension portions 750 may be vertically bent and extend from one end of each second extension portion 740 toward the body 710.

In this case, the first extension portions 730 to the third extension portions 750 may be formed integrally. In addition, the first extension portions 730 to the third extension portions 750 or the third extension portions 750 are formed of a material having dynamic stability, and the third extension portions 750 may be bent toward the first extension portions 730 by external force. In this case, the second roller portions 600 are disposed to come in contact with the third extension portions 750.

More specifically, the second roller portions 600 are pushed and rotated by the second arc portions 220 in accordance with the rotation of second housing 200, and the second rotation transfer portion 700 is pushed and rotated by the second roller portions 600. In this case, the third extension portions 750 of the second rotation transfer portion 700 coming in contact with the second roller portions 600 are bent toward the first extension portions 730, and the attachment of the third housing 300 engaging with the second roller portions 600 is released, thereby rotating. In this case, rotation speed difference of the second housing 200 is generated due to force pushing the third extension portions 750.

Due to the rotation speed difference between the first rotation transfer portion 400 and the second housing 200, the first roller portions 500 can be attached to the inner circumferential surface of the first housing 100 and the outer circumferential surface of the first arc portion 210 on the rotation direction side. In this case, the third extension portions 750 are positioned on both sides of the first extension portion 730, and it is possible to generate rotation speed difference between the first rotation transfer portion 400 and the second housing 200 irrespective of the rotation direction (forward rotation, reverse rotation).

The motor connection portion 800 is a constituent element which is coupled to a motor (not illustrated) and transfers rotational force of the motor to the first rotation transfer portion 400, and includes a disc 810, and a rotation shaft 820 formed at the center portion of the disc 810. The second roller portions 600, the second rotation transfer portion 700, and the third housing 300 are disposed on one surface of the disc 810. It is preferable that a diameter of the motor connection portion 800 is larger than a diameter of the through-hole 310 of the third housing 300. According to the embodiment of the present invention, the third housing 300 disposed on the upper surface of the motor connection portion 800 is formed integrally, and the third housing 300 may be also rotated in accordance with rotation of the motor connection portion 800.

The rotation shaft 820 is connected to the first rotation transfer portion 400. Accordingly, when the rotation shaft 820 is rotated, the first rotation transfer portion 400 can be also rotated together. According to the embodiment of the present invention, gear teeth for engagement with the other gear (not illustrated) may be formed on the outer circumferential surface of the disc 810.

Figure 4A:
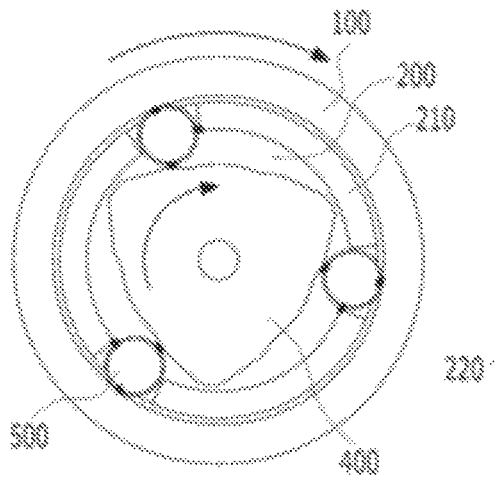
FIGS. 4A and 4B are diagrams illustrating that a clutch unit according to an embodiment of the present invention is changed to a control state.
Figure 4B:
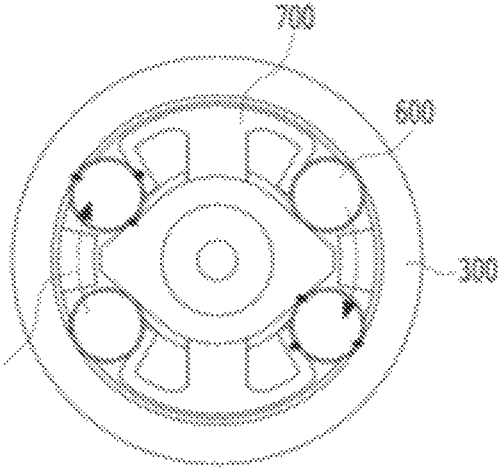

FIGS. 4A and 4B are diagrams illustrating that the clutch unit 1 according to the embodiment of the present invention is changed to a control state. FIG. 4A is a cross-sectional view of the first housing 100, the second housing 200, the first rotation transfer portion 400, and the like at the time of changing to the control state, and FIG. 4B is a cross-sectional view of the third housing 300, the second rotation transfer portion 700, and the like at the time of changing to the control state. In this case, the control state is a state where the clutch unit 1 is rotated by a motor, and the first housing 100 is rotated together with the second housing 200 and cannot be rotated by external force.

When the motor is rotated, the rotational force of the motor is transferred to the first rotation transfer portion 400, and the first rotation transfer portion 400 is rotated. The first rotation transfer portion 400 pushes and rotates the first roller portions 500 coming in contact with the roller contact surfaces 411. In this case, as the first roller portions 500 disposed between the first arc portions 210 is pushed and rotated, the second housing 200 provided with the first arc portions 210 is pushed by the first roller portions 500 and is also rotated together.

As the second housing 200 is rotated, the second roller portion 600 disposed between the second arc portions 220 is also pushed and rotted, and the second rotation transfer portion 700 positioned before the second roller portions 600 in the rotation direction is also rotated together. In this case, the third extension portions 750 of the second rotation transfer portion 700 is bent toward the first extension portions 730 by the second roller portions 600 positioned in the rotation direction of the second arc portions 220, and reduces the rotation speed of the second housing 200, and due to this, rotation speed difference occurs between the first rotation transfer portion 400 and the second housing 200. Due to the rotation speed difference, the first roller portions 500 are attached to the first housing 100, the first housing 100 is also rotated together with the second housing 200 by the first roller portions 500 coming in close contact.

Figure 5A:
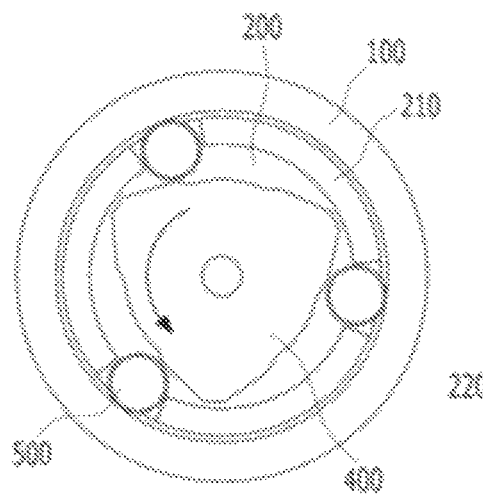
FIGS. 5A and 5B are diagrams illustrating that a clutch unit according to an embodiment of the present invention is changed to a free state.
Figure 5B:
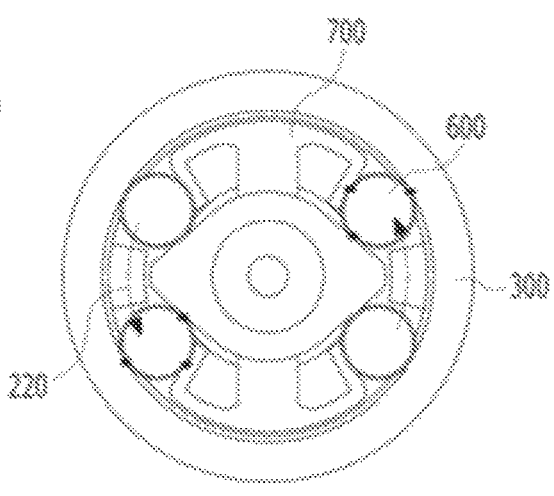

FIGS. 5A and 5B are diagrams illustrating that the clutch unit 1 according to the embodiment of the present invention is changed to a free state. FIG. 5A is a cross-sectional view of the first housing 100, the second housing 200, the first rotation transfer portion 400, and the like at the time of changing to the free state, and FIG. 5B is a cross-sectional view of the third housing 300, the second rotation transfer portion 700, and the like at the time of changing to the free state. In this case, the free state is a state where the first housing 100 of the clutch unit 1 is freely rotatable by external force. In this case, even when the first housing 100 is rotated, rotational force of the first housing 100 is not transferred to the first rotation transfer portion 400.

In the state illustrated in FIGS. 4A and 4B, when the motor is rotated (hereinafter, referred to as reverse rotation) in a direction opposite to the rotation direction of the motor illustrated in FIGS. 4A and 4B, the rotational force of the motor is transferred to the first rotation transfer portion 400, and the first rotation transfer portion 400 is reversely rotated. The first rotation transfer portion 400 pushes and reversely rotates the first roller portions 500 coming in contact with the roller contact surfaces 411. In this case, as the first roller portion 500 disposed between the first arc portions 210 is pushed and reversely rotated, the second housing 200 provided with the first arc portions 210 is pushed by the first roller portions 500 and is also reversely rotated together.

As the second housing 200 is reversely rotated, the second roller portion 600 disposed between the second arc portions 220 is pushed and reversely rotated, the second rotation transfer portion 700 positioned before the second arc portions 220 in the rotation direction is also reversely rotated. In this case, the third extension portions 750 of the second rotation transfer portion 700 are bent toward the first extension portions 730 and reduces the rotation speed of the second housing 200, and due to this, rotation speed difference occurs between the first rotation transfer portion 400 and the second housing 200. Due to the rotation speed difference, the first roller portions 500 coming in close contact with the first housing 100 and the second housing 200 are detached from the first housing 100 and the second housing 200.

Thereafter, when the first rotation transfer portion 400 is rotated as much as a space to the extent not to be attached to the first roller portion 500, the first roller portions 500 do not come in contact with the first rotation transfer portion 400 and do not come in close contact with the first housing 100 and the second housing 200. Accordingly, even when the first housing 100 is rotated, other parts therein are not rotated in accordance with rotation of the first housing 100. In other words, the first housing 100 is freely rotatable by external force.

FIGS. 4A and 4B and FIGS. 5A and 5B illustrate the clutch unit 1 changed to the control state by the forward rotation of the motor and changed to the free state by the reverse rotation of the motor, but it is obvious that the clutch unit 1 can be changed to the control state by the reverse rotation of the motor and can be changed to the free state by the forward rotation of the motor.

According to the embodiment of the present invention, when the first roller portions 500 are attached to the first housing 100 by using the rotation speed difference between the first rotation transfer portion 400 and the second housing 200, the rotational force of the second housing 200 is transferred to the first housing 100, and the first housing 100 is not rotated by external force. When the first roller portions 500 are detached from the first housing 100, the first housing 100 is freely rotatable by external force, and it is possible to provide a control state and a free state to a user.

In addition, according to the embodiment of the present invention, when the clutch unit 1 of the present invention providing a control state and a free state is applied to a virtual reality image control device, it is possible to improve sense of reality.

The description of the present invention is just an example, and it could be understood that persons skilled in the art can easily modify the embodiments to a specific form without changing technical spirit or essential characteristics of the present invention. Therefore, it should be understood that the embodiments described above are exemplary in all aspects and are not limitative. For example, each constituent element described in a singular type may be embodied to be distributed, and constituent elements described as being distributed may be embodied in a coupled type likewise.

The scope of the present invention is represented by Claims to be described below, and it should be interpreted that the meaning and scope of Claims and all modifications or modified forms derived from equivalent concept thereof are included in the scope of the present invention. A mode for carrying out the present invention has been described together in Description of Embodiments.

INDUSTRIAL APPLICABILITY

The present invention relates to a clutch unit, can be applied to a device including a clutch unit, has repetition possibility, and has industrial applicability.

The invention claimed is:

1. A clutch unit comprising:
a first housing which is provided with a groove recessed inwards;
a second housing which is inserted to the groove of the first housing, and is provided with first arc portions to protrude along a circumference thereof on one surface thereof;
first roller portions which are positioned between the first arc portions;
a first rotation transfer portion which is inserted to the second housing and is rotated in accordance with rotation of a motor; and
a speed change portion which is coupled to an other surface of the second housing and changes relative rotation speeds of the first housing and the second housing to attach and detach the first roller portions to and from the first housing,
wherein rotation of the first housing is controlled by the first rotation transfer portion and the first housing is not rotatable by external force when the first housing is attached to the first roller portions, and is freely rotatable by external force when the first housing is detached from the first roller portions, and
wherein the speed change portion reduces a speed of the second housing by friction.

2. The clutch unit according to claim 1, further comprising an attachment and detachment module which changes the relative rotation speeds of the first housing and the second housing provided with second arc portions on the other surface thereof to attach and detach the first roller portions to and from the first housing,
wherein the attachment and detachment module includes
a third housing which is provided with a through-hole in a stacking direction,
one or more second roller portions which are inserted to a through-hole, are positioned between the second arc portions, and are pushed and rotated by the second arc portions in accordance with rotation of the second arc portions,
a second rotation transfer portion which is inserted to the through-hole of the third housing and is pushed and rotated in accordance with rotation of the second roller portions, and
a motor connection portion which is coupled to one surface of the third housing, is connected to the motor, is rotated in accordance with rotation of the motor, and is provided with a rotation shaft transferring rotational force of the motor to the first rotation transfer portion,
wherein the second rotation transfer portion has one area formed of a material having dynamic stability and reduces a rotation speed of the second housing.

3. The clutch unit according to claim 1, wherein the first rotation transfer portion is provided with a roller contact surface on an outer circumferential surface thereof, a number of the roller contact surface being same as a number of the first roller portions.

4. The clutch unit according to claim 2, wherein the second rotation transfer portion includes
a body which is provided with a through-hole to which the rotation shaft of the motor connection portion is inserted,
first extension portions which vertically protrude from the body,
second extension portions which are vertically bent and extend from the first extension portion to a first side and a second side opposing to the first side,
third extension portions which are formed to extend from each second extension portion and have dynamic stability,
wherein the second rotation transfer portion is pushed and rotatable by the second roller portions, and the third extension portions can be compressed by the second roller portions at the time of rotating.

5. The clutch unit according to claim 3, wherein the first rotation transfer portion includes
a main body which is provided with the roller contact surface, and
a cylindrical rotation center shaft which vertically extends from one surface of the main body,
wherein the second housing is provided with a through-hole in a stacking direction, and the rotation center shaft is inserted to the through-hole of the second housing.

6. The clutch unit according to claim 2, wherein the first roller portions and the second roller portions are formed in a cylindrical shape.

* * * * *